United States Patent Office 3,177,125
Patented Apr. 6, 1965

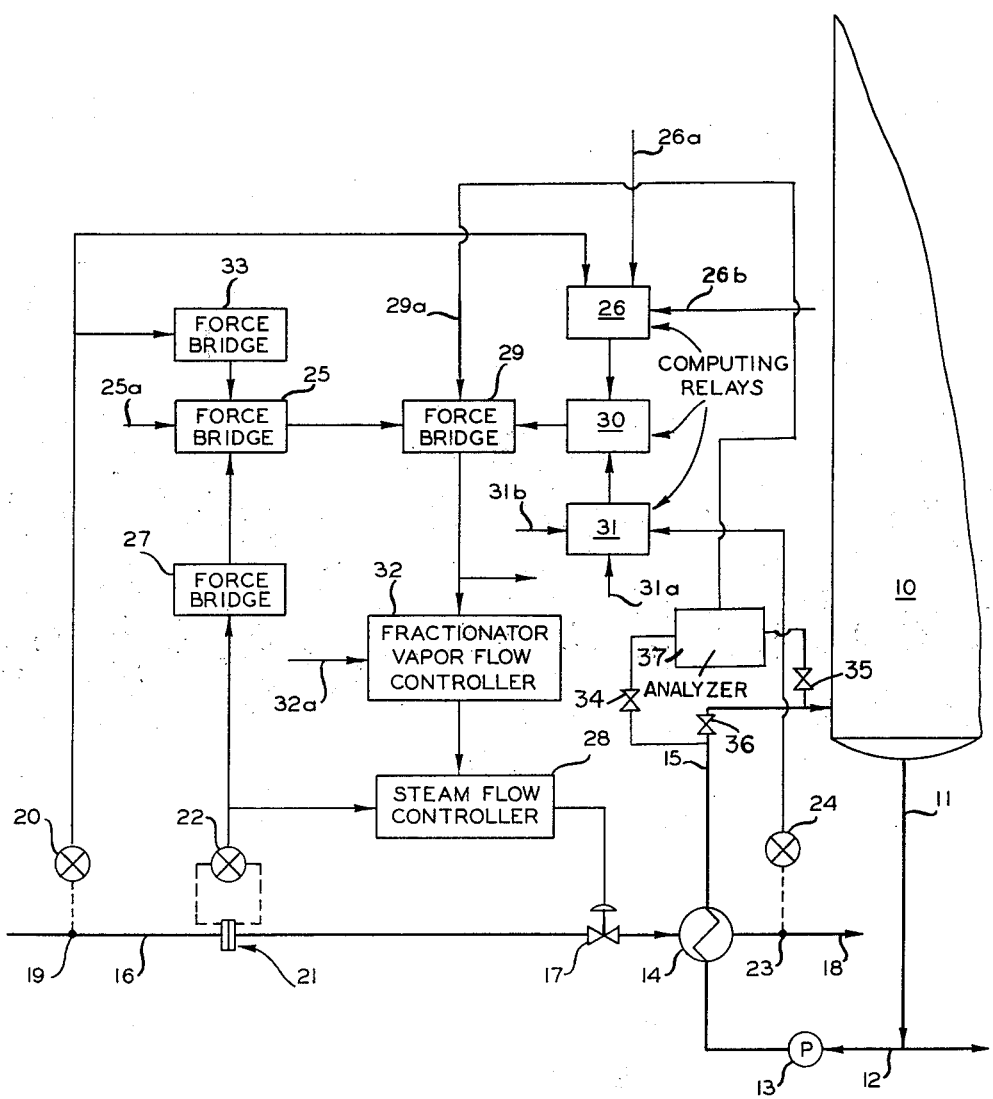

3,177,125
HEAT SUPPLY CONTROLLER
Donald E. Berger, Bartlesville, Okla., assignor to Phillips Petroleum Company, a corporation of Delaware
Filed Sept. 19, 1960, Ser. No. 56,963
5 Claims. (Cl. 202—40)

This invention relates to apparatus and method for determining the heat content of a flowing stream of vapor. In one aspect, this invention relates to a method and means for controlling the heat supply to a heat exchanger by a condensing stream of vapor. In another aspect, this invention relates to a method and apparatus for making a determination of the heat content of a vapor by automatically measuring properties of the vapor and correlating the measured properties to produce a signal proportional to the heat content. In another aspect, this invention relates to a method and apparatus for controlling the heat supply to a fractionation tower by automatically computing the heat given up to the tower by a heat supplying vapor and controlling the flow of said vapor to maintain the heat supply to said tower constant. In another aspect, this invention relates to a method and apparatus for automatically controlling the vapor boil-up of a fractionation tower by controlling the rate of flow of the heat supplying vapor to said tower.

It is often convenient to supply heat to a chemical process or other heat utilizing processes by circulating a condensing vapor. It is desirable in such processes to control the amount of heat supplied. To provide such control it is necessary to determine the heat supply rate and the quantity of heat supplied. Where the process to which heat is being supplied is a fractional distillation, the rate of vapor boil-up is an important consideration and is a function of the heat supplied to the process.

It is an object of the present invention to provide a measurement of the heat content of a flowing stream of vapor. It is another object to provide a control of the amount of heat supplied to a heat utilizing zone by a condensing stream of vapor. It is a further object of this invention to provide a control of the vapor boil-up rate in a fractional distillation operation by controlling the flow of a stream of vapor supplying heat to said operation.

Other aspects, objects, and the several advantages of the invention are apparent from a study of the disclosure, the drawing, and the appended claims.

According to the present invention, there are provided method and apparatus for controlling the heat supplied to a heating process by a flowing stream of vapor by determining the heat given up by the vapor and controlling the flow of the vapor in response to this determination. The determination of the heat given up is made by determining the enthalpy of the stream entering and leaving the zone in which the heat is supplied. According to my invention, the determination of the enthalpy is made by measuring properties of the stream as it enters and leaves the heat absorbing zone and converting these properties to measurements of enthalpy. Further, according to my invention, there are provided method and apparatus for determining the vapor boil-up rate of a fractional distillation column by measuring the heat supplied to the column by a flowing stream of vapor and controlling the vapor as a function of the boil-up rate.

The drawing is a diagrammatic representation of a suitable combination of control elements to practice my invention.

In the drawing, fractionator 10 is provided with bottoms draw-off 11 in which there is provided a branch 12 to pump 13, reboiler 14, and return line 15 to fractionator 10. Heat to reboiler 14 is provided by steam which flows through steam inlet 16 and control valve 17. Condensate is removed through line 18. Steam inlet 16 is provided with pressure sensing element 19, connected with pressure transmitter 20, and orifice meter 21, connected with transmitter 22. Line 18 is provided with a temperature sensing element 23 and temperature transmitter 24.

Pressure transmitter 20 is connected with force bridge 33 and with computing relay 26. Force bridge 33 is connected with force bridge 25. Transmitter 22 is connected with force bridge 27 and with controller 28, which is operatively connected with control valve 17. The output of force bridge 25 is fed to force bridge 29, which also receives a signal from adding relay 30, which in turn receives signals from computing relay 26 and computing relay 31. Computing relay 31 receives an actuating signal from transmitter 24. The output of force bridge 29 is fed to recorder controller 32 which in turn is connected with the set point adjustment of controller 28. Constant adjustable modifying signals 25a, 26a, 29a, 31a, and 32a are fed to elements 25, 26, 29, 31, and 32, respectively.

The heat input to reboiler 14 can be determined as the product of steam flow in pounds per unit time and the change of enthalpy of the steam as it passes from line 16 to line 18. The mass flow of steam is given by $$F = C\sqrt{P \cdot \Delta p}$$

wherein F is the steam flow in pounds per hour, C is the meter coefficient, P is the absolute pressure in pounds per square inch, and $\Delta p$ is the pressure differential across the orifice meter. As will be understood, the meter coefficient has included within it factors to correct the units as required and to relate the measurement to the particular vapor (in this instance, steam) flowing. The heat supplied can be expressed by $$Q = F(h_1 - h_2)$$

wherein $Q$ = heat supplied in B.t.u. per hour, $h_1$ = enthalpy of stream in line 16 in B.t.u. per pound, and $h_2$ = enthalpy in line 18 in B.t.u. per pound.

The vapor flow rate in fractionator 10, in the lower section thereof, is generated by heat from reboiler 14. This rate can be computed according to $$V_B = \frac{F(h_1 - h_2)}{H_v} = \frac{Q}{H_v}$$

wherein $V_B$ = vapor flow rate (boil-up rate) in pounds per hour, $H_v$ = heat of vaporization of kettle product in B.t.u. per pound.

Assuming the steam supplied through line 16 is saturated, a common situation, the enthalpy of this steam can be determined as a function of either its pressure or temperature. Where the steam is superheated, the enthalpy can be derived from measurements of pressure and temperature and utilizing suitable computer components. The enthalpy $h_2$ of the condensate in line 18 is a function of the temperature of the stream. Where partial condensation takes place the determination of the enthalpy of this stream would require more complex computations and additional apparatus not disclosed herein.

In operation, the pressure measurement from element 19, transmitted by transmitter 20, is employed in computing relay 26 in conjuction with manual adjustments 26a and 26b to produce an output signal from relay 26 which is proportional to the enthalpy of this stream. This procedure is feasible when the steam flowing in line 16 is saturated and, as noted above, the enthalpy determination can also be made from a temperature signal. In the present operation it is preferred to use a pressure signal since this latter signal also is used in the determination of the mass flow rate, as explained below.

The pressure signal from transmitter 20 is also sent to force bridge 33 which feeds a signal proportional to the square root of said pressure signal into force bridge 25. The signal proportional to the square of the flow rate in line 16 is sent by transmitter 22 to force bridge 27, which performs the function of extracting the square root of this signal and thus, sending a signal to force bridge 25 which is directly proportional to the rate of flow. Force bridge 25 multiplies the signal from force bridge 27, the signal from force bridge 33, and a signal 25a, the latter signal being proportional to the meter coefficient, to produce an output signal which is proportional to the mass rate of flow in line 16. This latter signal is fed to force bridge 29. The temperature signal from transmitter 24 is employed in computing relay 31 in conjunction with manual adjustments 31a and 31b to produce an output signal proportional to the enthalpy of this condensate stream. This latter signal along with the output signal from relay 26 is fed to adding relay 30, which produces a signal proportional to the difference between the signal from relay 26 and the signal from relay 31, which signal is thus proportional to the difference in enthalpies of the streams in line 16 and line 18. This signal enters force bridge 29 wherein it is multiplied by the signal from force bridge 25 and the product divided by signal 29a, which latter signal is proportional to the heat of vaporization of the kettle product in fractionator 10, whereby the output signal from force bridge 29 is proportional to the vapor boil-up rate in fractionator 10. This signal is fed to controller 32 wherein the set point is automatically adjusted by signal 32a or may be set manually, and the output of controller 32 is connected to manipulate the set point of flow controller 28 and thus adjust the rate of flow control of the heating fluid (steam) to maintain the vapor boil-up rate at the desired value.

It will be understood, of course, that signal 29a, the heat of vaporization of the kettle product, can be represented by a constant signal in those instances wherein the product remains essentially constant, or can be supplied by other measuring and/or analyzing apparatus in accordance with a varying kettle product. For example, this variable can be supplied by a temperature, refractive index, specific gravity, or other analyzer suitable to the nature of the operation and the product. With valves 34 and 35 open, and valve 36 closed, the kettle reboiler stream is diverted through an analyzer 37 in which signal 29a is generated.

As a further variation, the signal from force bridge 29 can also be fed to additional control systems. For example, it may be desirable to control the ratio of downflowing liquid to the upflowing vapors, and this signal can be so utilized. In fact, it may be desirable in some instances to control the liquid to vapor ratios in both top and bottom sections of the column.

In a preferred form of the invention, the described control system is operated by air pressure. For example, transmitters 20, 22, and 24 can all supply air pressure proportional to the measured properties and the adding relays, force bridges, and computing relays, in turn, modify and supply additional such pressure signals. Where air pressures are used, it is necessary to supply air to the various components, but it has not been thought necessary to show such an air supply system since such systems are well known in the art and to show such a system here would simply complicate the drawing unnecessarily.

All of the various components, that is, the sensing elements, transmitters, adding relays, force bridges, control valves, etc., are well known in the art and, therefore, details of their construction have not been shown here. For example, Taylor Transaire pressure transmitter No. 317RN, described in Taylor Instrument Company Brochure 2B100 of December 1952 may be used for pressure transmitter 20. Taylor transmitter No. 317RG, also described in the above-mentioned brochure, may be used for temperature transmitter 24. Relays 26, 30, and 31 may be supplied as Foxboro M-56 computing relays, described in Foxboro Brochure 37-57A of September 12, 1956. The Sorteberg force bridge, described in Minneapolis Honeywell catalogue No. C80-1 of September 1956, may be used for force bridges 25, 27, 29 and 33. Foxboro M-40 controller, described in Foxboro Bulletin 5A-10A of November 1955, may be used for controllers 28 and 32.

Although, in one important aspect of the invention, the system involved the use of proportional air pressures, it is also within the scope of the invention to practice the invention using electrical components and electrical signals. For example, Philbrick Electronic Computing Amplifiers, described in a 1956 brochure of George A. Philbrick Researchers, Inc., 230 Congress Street, Boston 10, Massachusetts, may be used instead of the previously specified pneumatic adding relays and force bridges.

Reasonable variation and modification are possible with the scope of the foregoing disclosure, drawing, and appended claims to the invention, the essence of which is that there are provided apparatus and method to determine the heat content of a flowing stream of vapor, method and apparatus to control the heat supplied by a stream of condensing fluid, and method and apparatus for controlling the rate of vapor boil-up in a fractionation column by controlling the flow of a stream of condensing fluid supply heat thereto.

I claim:

1. The method of controlling the heat supplied to a fractionation tower wherein heat is supplied to a heating zone by a flowing stream of vapor which comprises determining the mass rate of flow of said stream and producing in response thereto a first signal proportional thereto, determining the enthalpy of said stream at a point prior to entering said zone and producing in response thereto a second signal proportional thereto, determining the enthalpy of said stream at a point after leaving said zone and producing in response thereto a third signal proportional thereto, producing a fourth signal proportional to the heat of vaporization of the kettle product of said fractionation tower in response to a measurement of a property of said kettle product indicative of said heat of vaporization, automatically combining said first, second, third, and fourth signals to produce a fifth signal proportional to the heat supplied by said stream to said zone divided by said heat of vaporization whereby said fifth signal varies as said kettle product varies and controlling the flow of said stream as a function of said fifth signal.

2. The method of controlling the heat supplied to a fractionation tower by a flowing stream of saturated steam which comprises measuring the rate of flow of said stream entering a heat exchange zone associated with a fractionation zone and producing in response thereto a first signal proportional thereto, measuring the pressure of said stream entering said heat exchange zone and producing in response thereto a second signal proportional thereto, automatically modifying said second signal to produce a third signal proportional to the enthalpy of said stream, measuring the temperature of said stream leaving said heat exchange zone and producing in response thereto a fourth signal proportional thereto, modifying said fourth signal to produce a fifth signal proportional to the enthalpy of said stream leaving said heat exchange zone, combining said third and fifth signals to produce a sixth signal which is proportional to the change of enthalpy of said stream through said heat exchange zone, combining said first and second signals to produce a seventh signal which is a function of the mass rate of flow of said stream, producing an eighth signal proportional to the heat of vaporization of the kettle product of said fractionation tower in response to a measurement of a property of said kettle product indicative of said heat of vaporization, combining said sixth, seventh and eighth signals to produce a ninth signal which varies as said kettle product varies and which is proportional to the vapor boil-up rate in said fractionation zone and controlling the rate of flow of said stream responsive to said ninth signal.

3. Apparatus for controlling the heat supplied to a fractionation column as a function of the vapor boil-up rate in said column comprising means to supply heat to said column from a flowing stream of vapor, a flow meter adapted to measure the flow of said stream and to produce a first signal proportional to the square of said flow, a force bridge adapted to modify said first signal to produce a second signal proportional to said flow, a pressure measuring element communicating with said stream, a pressure transmitter operatively connected with said pressure measuring element adapted to produce a third signal proportional to said pressure, a force bridge adapted to combine said second and third signals to produce a fourth signal which is a function of the mass rate of flow of said stream, computing relay adapted to modify said third signal to produce a fifth signal proportional to the enthalpy of said stream entering said means to supply heat, a temperature sensing element adapted to measure the temperature of said stream leaving said means to supply heat, a temperature transmitter operatively connected with said temperature element adapted to produce a sixth signal proportional to said temperature, a computing relay adapted to modify said sixth signal to produce a seventh signal proportional to the enthalpy of said stream leaving said means to supply heat, an adding relay adapted to combine said fifth and seventh signal to produce an eighth signal which is a function of the change of enthalpy of said stream through said means to supply heat, an analyzer adapted to measure a property of the kettle product of said fractionation column and produce a ninth signal proportional to the heat of vaporization of said kettle product, a force bridge adapted to combine said fourth, eighth and ninth signals to produce a tenth signal which varies with variations in said heat of vaporization and which is proportional to the vapor boil-up rate in said fractionation column and means to control the flow of said stream responsive to said tenth signal.

4. The method of controlling the heat supplied to a fractionation tower wherein heat is supplied to a heating zone by a flowing stream of saturated steam, which comprises determining the mass rate of flow of said stream (F) and producing in response thereto a first signal proportional thereto, determining the enthalpy ($h_1$) of said stream at a point prior to entering said zone and producing in response thereto a second signal proportional thereto, determining the enthalpy ($h_2$) of said stream at a point after leaving said zone and producing in response thereto a third signal proportional thereto, producing a fourth signal proportional to the heat of vaporization ($H_v$) of the kettle product of said fractionation tower in response to a measurement of a property of said kettle product indicative of said heat of vaporization, automatically combining said first, second, third, and fourth signals according to the equation $$V_B = \frac{F(h_1 - h_2)}{H_v}$$

to produce a fifth signal ($V_B$) proportional to the heat supplied by said stream to said zone divided by said heat of vaporization whereby said fifth signal varies as said kettle product varies and controlling the flow of said stream as a function of said fifth singal.

5. The method of controlling the heat supplied to a fractionation tower by a flowing stream of saturated steam, which comprises measuring the pressure differential ($\Delta t$) across an orifice in said stream and producing in response thereto a first signal proportional thereto, measuring the pressure ($p$) of said stream entering said heat exchange zone and producing in response thereto a second signal proportional thereto, automatically modifying said second signal to produce a third signal proportional to the enthalpy of said stream ($h_1$), measuring the temperature of said stream leaving said heat exchange zone and producing in response thereto a fourth signal proportional thereto, modifying said fourth signal to produce a fifth signal proportional to the enthalpy ($h_2$) of said stream leaving said exchange zone, combining said third and fifth signals to produce a sixth signal which is proportional to the change of enthalpy of said stream through said heat exchange zone ($h_1 - h_2$), combining said first and second signals according to the equation $F = C\sqrt{P \cdot \Delta p}$ to produce a seventh signal which is a function of the mass rate of flow of said stream (F), producing an eighth signal proportional to the heat of vaporization to the kettle product of said fractionation tower in response to a measurement of a property of said kettle product indicative of said heat of vaporization, combining said sixth, seventh and eighth signals according to the equation $$V_B = \frac{F(h_1 - h_2)}{H_v}$$

wherein $H_v$ is the heat of vaporization of the kettle product of said fractionation zone, to produce a ninth signal which varies as said kettle product varies and is proportional to the vapor boil-up rate in said fractionation zone ($V_B$) and controlling the rate of flow of said stream responsive to said ninth signal.

References Cited by the Examiner
UNITED STATES PATENTS

| | | | |
|---|---|---|---|
| 2,572,253 | 10/51 | Fellows et al. | 236—23 |
| 2,664,391 | 12/53 | Coulter | 202—40 |
| 2,689,932 | 9/54 | Hornfeck | 236—23 |
| 2,754,053 | 7/56 | Howe et al. | |
| 2,917,437 | 12/59 | Kleiss et al. | 202—160 |
| 3,034,718 | 5/62 | Frietas et al. | |

OTHER REFERENCES

"Automatic Control," May 1958, vols. 7–8, pp. 43–48.

NORMAN YUDKOFF, *Primary Examiner*.

GEORGE D. MITCHELL, CHARLES SUKALO,
*Examiners.*

UNITED STATES PATENT OFFICE
CERTIFICATE OF CORRECTION

Patent No. 3,177,125                                 April 6, 1965

Donald E. Berger

It is hereby certified that error appears in the above numbered patent requiring correction and that the said Letters Patent should read as corrected below.

Column 5, line 15, before "computing" insert -- a --; column 6, line 5, for "singal" read -- signal --; line 20, after "said", second occurrence, insert -- heat --; line 28, for "to" read -- of --.

Signed and sealed this 24th day of August 1965.

(SEAL)
Attest:

ERNEST W. SWIDER
Attesting Officer

EDWARD J. BRENNER
                                                                Commissioner of Patents